United States Patent [19]

Prinssen

[11] Patent Number: 5,133,883
[45] Date of Patent: Jul. 28, 1992

[54] METHOD FOR REMOVING LIQUID FROM A MIXTURE OF LIQUID AND SOLID MATTER

[75] Inventor: Alphons A. J. A. Prinssen, 's-Hertogenbosch, Netherlands

[73] Assignee: Elektronweg 24, Utrecht, Netherlands

[21] Appl. No.: 702,499

[22] Filed: May 20, 1991

[30] Foreign Application Priority Data

May 21, 1990 [NL] Netherlands ............. 9001170

[51] Int. Cl.⁵ .................................. B01D 33/04
[52] U.S. Cl. ................... 210/783; 210/386; 210/401
[58] Field of Search .......... 210/770, 771, 780, 783, 210/784, 386, 400, 401, 406, 416.1

[56] References Cited

U.S. PATENT DOCUMENTS

| | | | |
|---|---|---|---|
| 3,459,122 | 8/1969 | Pastoors et al. | 210/386 |
| 3,531,404 | 9/1970 | Goodman et al. | 210/783 |
| 4,038,193 | 7/1977 | Oosten | 210/400 |
| 4,101,400 | 7/1978 | Pepping | 210/729 |
| 4,153,550 | 5/1979 | Lautrette | 210/770 |
| 4,194,946 | 5/1980 | Ootani et al. | 210/780 |
| 4,324,659 | 4/1982 | Titoff | 210/386 |
| 5,041,222 | 8/1991 | O'Dell | 210/386 |

FOREIGN PATENT DOCUMENTS

| | | |
|---|---|---|
| 529819 | 12/1921 | France . |
| 2168154 | 8/1973 | France . |
| 2194466 | 3/1974 | France . |
| 2374937 | 7/1978 | France . |
| 2416043 | 8/1979 | France . |

Primary Examiner—Ernest G. Therkorn
Attorney, Agent, or Firm—Oblon, Spivak, McClelland, Maier & Neustadt

[57] ABSTRACT

A method for removing liquid from a mixture of liquid and solid matter wherein the mixture is led over one or more casings by a conveyor belt which is pervious to liquid. In use a sub-atmospheric pressure is generated in the casings during a first period, in which the casing(s) and the conveyor belt are stationary with respect to each other, while at the same time a pressure is exerted on the mixture by one or more rollers. During a period following the first period, a relative movement takes place between the conveyor belt and the casing(s), while during this period no sub-atmospheric pressure is exerted in the casings and no compressive force is exerted on the mixture by the rollers.

9 Claims, 5 Drawing Sheets

METHOD FOR REMOVING LIQUID FROM A MIXTURE OF LIQUID AND SOLID MATTER

BACKGROUND OF THE INVENTION

1. Field of the Invention:

The invention relates to a method for removing liquid from a mixture of liquid and solid matter, whereby the mixture is led over one or more casings by means of a conveyor belt which is pervious to liquid, whereby during first periods of an operation in which said casing(s) and said conveyor belt are stationary with respect to each other and in which a sub-atmospheric pressure is maintained in said casing(s), are alternated with second periods in which a relative movement between the conveyor belt and the casing(s) is effected and the pressure in the casing(s) is kept at that of the surrounding atmosphere.

2. Discussion of the Background:

Such a method can be derived from FR-A-2,194,466. Said known device is satisfactory by itself, but in a number of cases it may be desirable to effect an even better removal of liquid from a mixture of liquid and solid matter.

SUMMARY OF THE INVENTION

According to the invention the mixture is compressed by means of pressure rollers during said first periods, so as to promote the discharge of liquid, which pressure rollers are arranged near the casing(s), above the part of the conveyor belt supporting the mixture and which are independently pressed down on the mixture with an adjustable force, while during said second periods the rollers do not exert a force in the direction of the conveyor belt on the mixture.

By using the method according to the invention a particularly effective removal of liquid from the mixture can be obtained during the periods when the casing(s) and the belt are stationary with respect to each other, as a result of the sub-atmospheric pressing the casing(s) and the simultaneous compression of the mixture by means of the pressure rollers. By not exerting a force in the direction of the conveyor belt by means of the pressure rollers during said second periods, the casing(s) and the belt can move with respect to each other, without undesirably large forces being exerted on the parts formed by the casing(s) and the conveyor belt which are moving with respect to each other, which forces might lead to excessive wear and/or rupture of the parts in question.

It is noted that from FR-A-2,168,154 a device is known which is provided with a filter belt which moves over a trough. Near said trough a few pressure rollers are disposed above the filter belt, said rollers only being supported on the belt under the influence of their own weight. It is not possible hereby to release the pressure exerted on the material by the rollers, nor is it possible to control the pressure exerted by the rollers independently. Consequently such a construction will not be suitable for use in a device wherein the belt moves over casings in which a sub-atmospheric pressure can be generated.

A similar device is known from U.S. Pat. No. 3,531,404. This publication does not relate to a device in which the extraction of liquid from a mixture is promoted by means of a vacuum either. Also with this known device the rollers occupy a fixed position with respect to the conveyor belt, by means of which the material to be de-watered is moved. Said publication does mention, however, that the rollers are mounted in such a manner that it is possible to adjust the pressure exerted by the rollers, but no means are provided for moving the rollers, once they are arranged in a certain position, to and fro between a position in which they exert an effective pressure on the mixture to be de-watered and a position, in which no substantial pressure is exerted on said mixture.

A device according to the invention, which is particularly suited for carrying out a method according to the invention is described in claim 4.

When using such a device it is possible, if required, to exert additional, independently adjustable pressures on the mixture present on the conveyor belt, by means of the various pressure rollers, during those periods in which a vacuum is generated in the casing(s), as a result of which a very effective de-watering adapted to the material to be processed can be achieved.

The invention will be explained in more detail hereafter, with reference to a few possible embodiments of a device according to the invention diagrammatically illustrated in the accompanying Figures.

DESCRIPTION OF THE PREFERRED EMBODIMENTS

Figure 1:
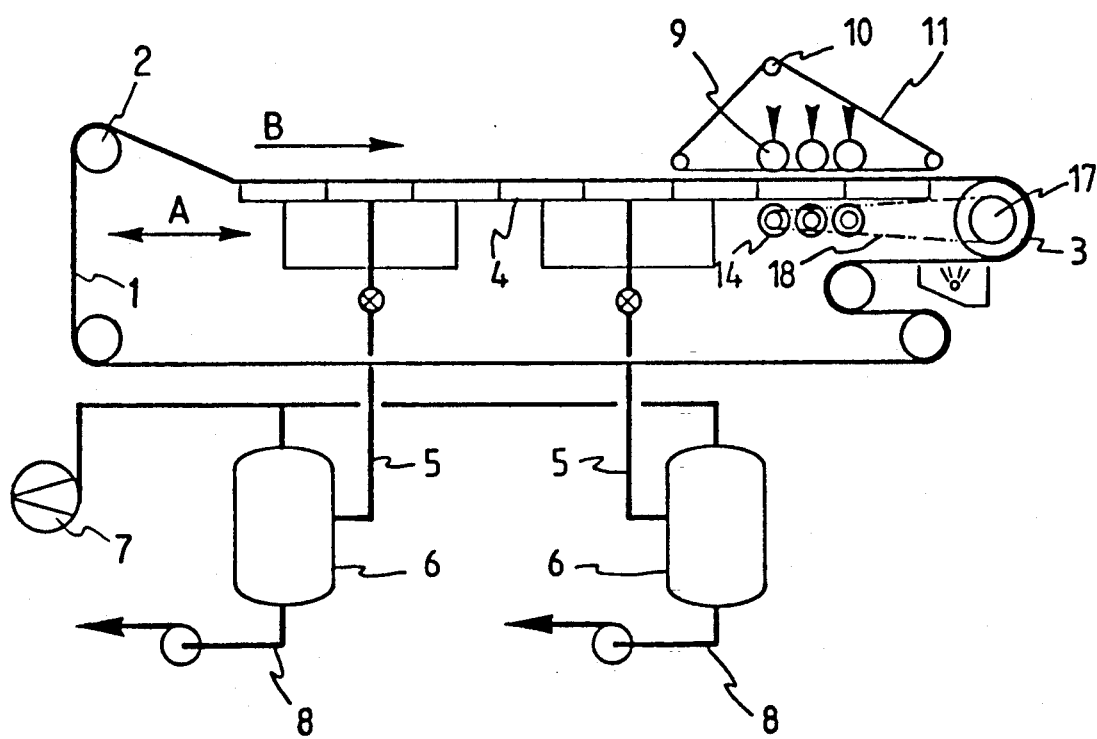
FIG. 1 is a diagrammatic side elevational view of a first embodiment of a device according to the invention.

The device shown in FIG. 1 comprises an endless conveyor belt 1 which is pervious to liquid, said conveyor belt being passed over guide rollers 2 and a drive pulley 3.

The upper part of the conveyor belt 1, on which the mixture of liquid and solid matter is present during operation, and which thus forms the mixture-moving conveying portion of the conveyor belt, is led over one or more casings 4 which are coupled together, said casings being connected, by means of pipes 5, to vessels 6 in which a sub-atmospheric pressure can be generated by means of a vacuum pump 7 connected to said vessels. Liquid collected in said vessels 6 can be discharged via the pipes 8. The casings 4 can be moved to and fro in the direction indicated by the arrow A by driving means (not shown).

The construction of such a device, as far as described above, is generally known per se.

According to the invention a plurality of rollers 9, three in the illustrated embodiment, are provided near the downstream end of the upper conveying portion of the conveyor belt 1. Said rollers 9 are resting on a part of a pressure belt 11 supported by guide rollers, said part extending parallel to the upper part of the conveyor belt 1.

Figure 2:
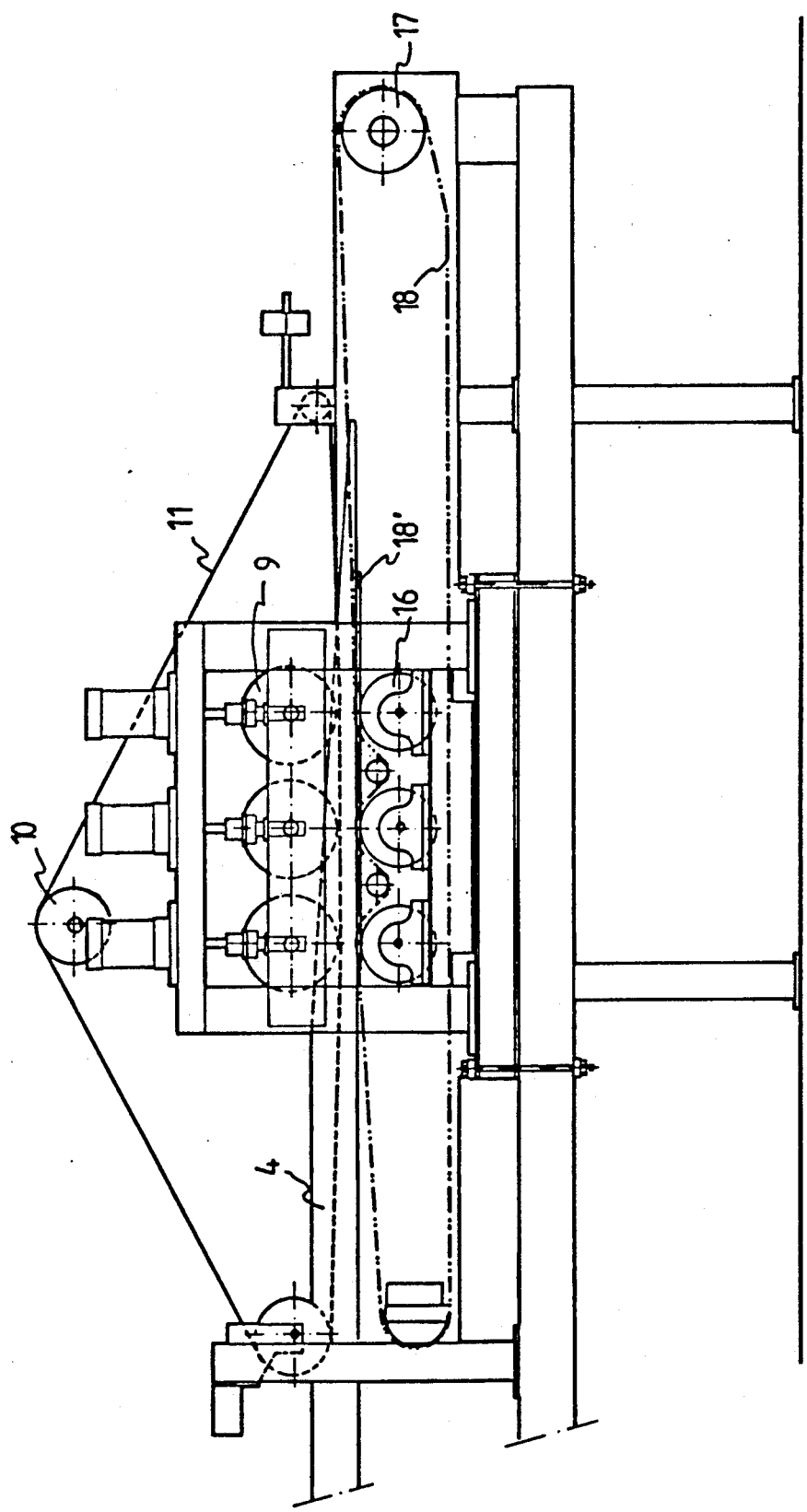
FIG. 2 is a larger-scale view of a part of the device shown in FIG. 1.
Figure 3:
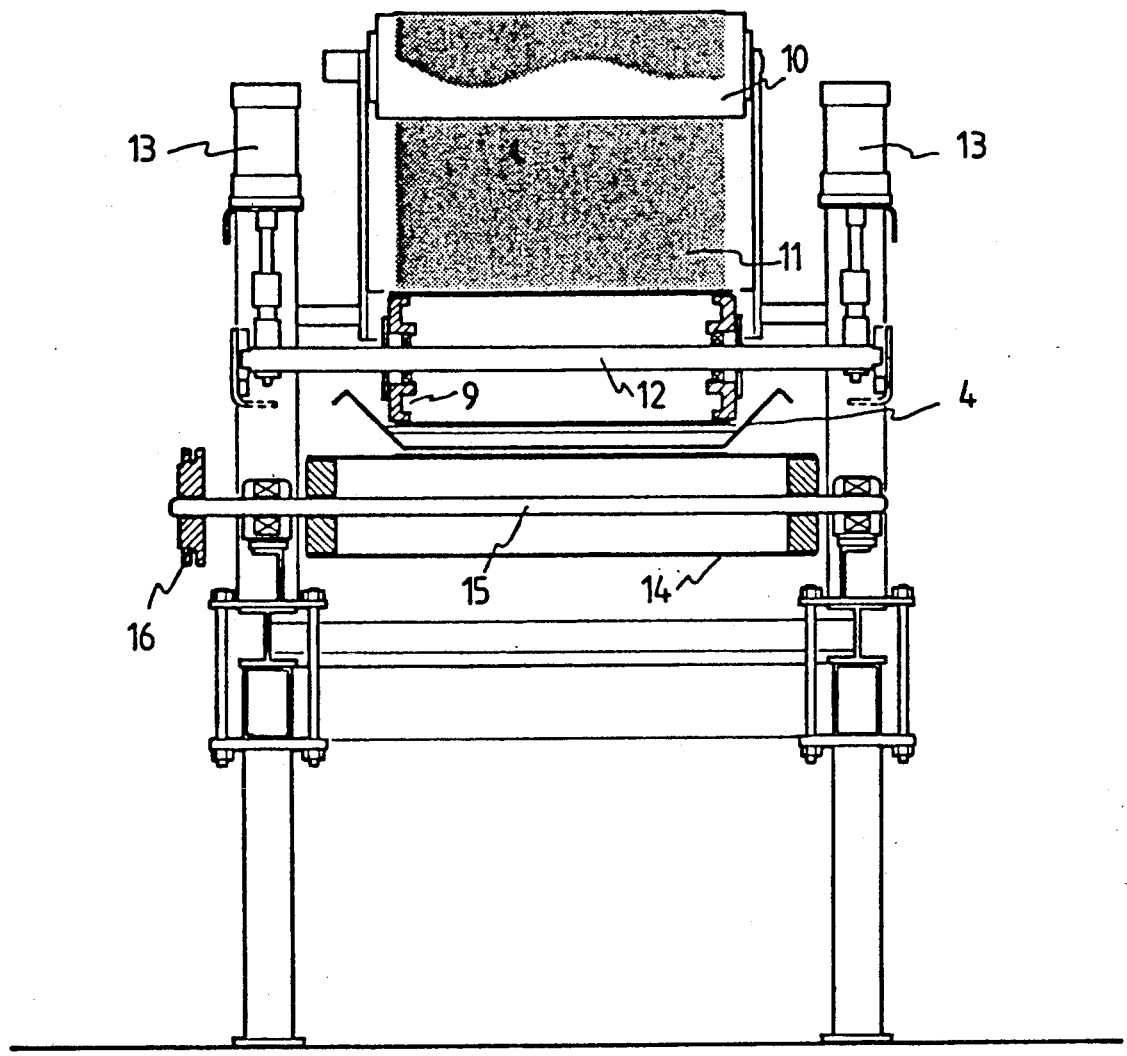
FIG. 3 is a cross-sectional view of FIG. 2.

As is illustrated in greater detail in FIGS. 2 and 3, each of the rollers 9 is freely rotatably supported by a shaft 12. The ends of each shaft 12 are coupled to setting cylinders 13, by means of which the shaft 12, and with it the roller 9 supported by the shaft 12 in question, can be moved in a vertical direction.

Three supporting rollers 14 extending parallel to the rollers 9 are disposed under the casing(s) 4, near the pressure rollers 9. Each supporting roller 14 is mounted on a shaft 15. Each shaft 15 has a sprocket wheel 16 mounted on one of its ends. An endless driving chain 18 is passed over said sprocket wheels and over a sprocket wheel 17 coupled to the driving drum 3, as is diagrammatically indicated in FIG. 2.

Near the supporting rollers 14 a reinforcing plate 18 is provided between the supporting rollers and the bottom side of the casing(s) 4.

During operation the conveyor belt 1 will generally be driven continuously by means of the driving drum 3, in such a manner that the upper part of said conveyor belt 1 is moved in the direction according to the arrow B. As already said before the casing(s) 4 are moved to and fro during operation by driving means (not shown). When the casings move in the same direction as the upper part of the conveyor belt 1 a sub-atmospheric pressure will be generated in at least some of the casing(s) 4, so as to suck liquid from the mixture of liquid and sold matter present on the belt 1. During movement of the casing(s) 4, in a direction opposite the direction of movement of the conveyor belt, generally no vacuum will be maintained in the casing(s) 4, in order to prevent the conveyor belt from adhering to the casings during the return movement.

When the casings 4 are moved in the same direction as the upper part of the conveyor belt 1, the rollers 9 will be pushed downwards by means of the setting cylinders 13, so as to exert pressure, via the pressure belt 11, on the material present on the conveyor belt 1, in order to squeeze moisture from said material. The compressive force exerted on the casing(s) 4 is thereby transmitted, via the plate 18', to the supporting rollers 14. The drive of said supporting rollers by means of the chain 18 and the sprocket wheels 16 and 17 is thereby chosen such that the peripheral velocity of the parts of the supporting rollers 14 making contact with the plate 18' is at least substantially equal to the rate of displacement of the conveyor belt 1 in the direction indicated by the arrow B.

During the return movement of the casings the pressure rolers 9 will be moved upwards, so as to prevent the occurrence of undesirable forces in the system.

Preferably the forces exerted on the pressure rollers 9 by means of the setting cylinders 13 can be independently adjusted for each pressure roller, so as to be able to squeeze out the material present on the conveyor belt 1 in the most optimal manner.

Of course modifications and/or additions to the above-described embodiment are possible within the spirit and scope of the invention.

Thus it is e.g. conceivable, as is also the case with similar known devices, to drag along the casings 4 in the direction according to the arrow B by means of the conveyor belt 1, by the forces which are generated as a result of the conveyor belt being sucked against the casing 4. Since large forces are exerted by the pressure rollers, however, it is preferred to provide a positive drive for the casings 4.

Figure 4:
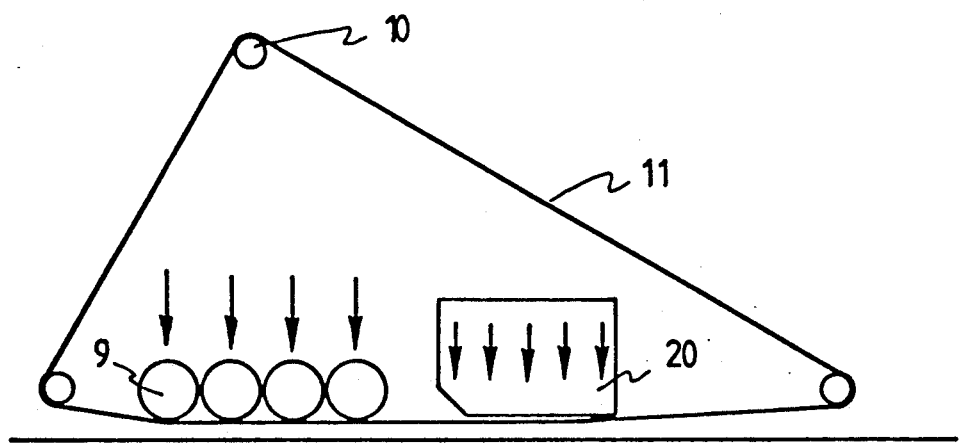
FIG. 4 is a diagrammatic, larger-scale view of a part of the device shown in FIG. 1, illustrating a modified embodiment.

Furthermore a casing 20 may be provided beside the pressure rollers 9, as is diagrammatically shown in FIG. 4, via which pressurized air or a suitable gas can be blown through the layer of mixture present on the conveyor belt 1, so as to blow off moisture present in said layer of mixture in this manner. The casing 20 may occupy a fixed position thereby, or be reciprocatingly movable by means of setting cylinders, in a similar manner as the pressure rollers 9.

Also it will be possible within the spirit and scope of the invention to provide the pressure rollers 9 and/or the casing 20 without using the pressure belt 11.

Figure 5:
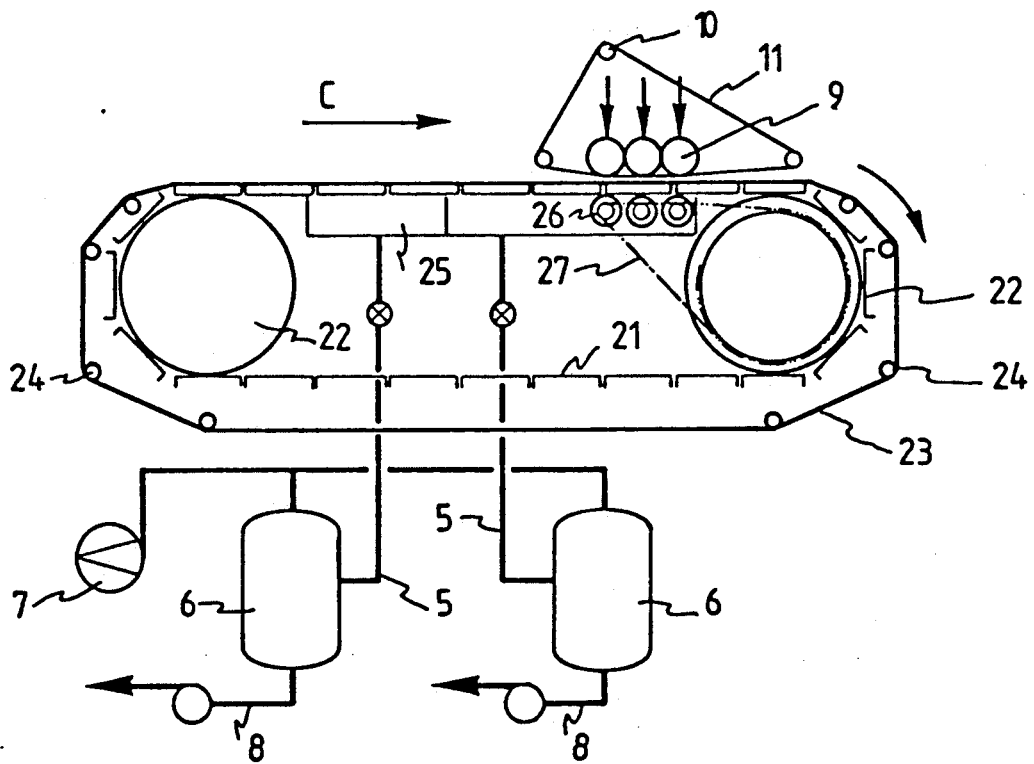
FIG. 5 is a diagrammatic side elevational view of a second embodiment of a device according to the invention.
Figure 6:
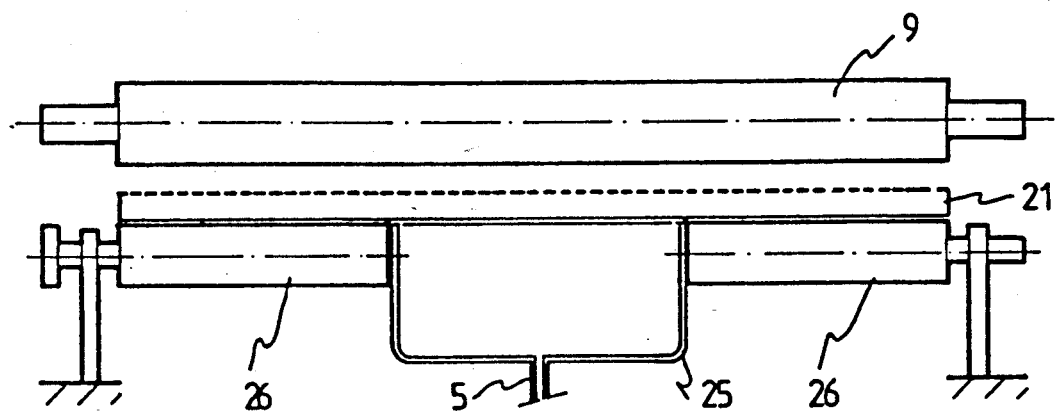
FIG. 6 is a larger-scale cross-sectional view of a part of FIG. 5, wherein for reference certain parts have been left out.

With the embodiment according to FIG. 5 use is made of a number of casings 21 which are pivotally coupled together so as to form an endless chain, said casings being passed over guide rollers 22, whereby at least one of said guide rollers is driven. Said device is furthermore provided with an endless conveyor belt or filter belt 23 whose path, guided by guide rollers 24, is such that the upper part of said conveyor belt 23 is supported on the upper part of the endless chain formed by the casings 21. The bottoms of the casings 21 are provided with perforations, which move, in the upper part of the chain formed by the casings 21, over casings 25 disposed under said upper part, in which casing a sub-atmospheric pressure can be generated by means similar to those described with reference to the first embodiment.

Near the downstream end of the upper part of the conveyor belt 23 pressure rollers 9 and a pressure belt 11 are provided again, in a similar manner as explained with reference to the first embodiment. Near said pressure rollers 9 the casings 21 are supported by supporting rollers 26 provided under the casings 21 and on both sides of the casings 25, which supporting rollers 26 can again be rotated via a chain 27.

With this known device the endless chain formed by the casings 21 and the conveyor belt 33 moves continuously in the direction according to the arrow C, while a sub-atmospheric pressure is being generated in the casings 25. By means of the rollers 9 a pressure may be exerted again, in a similar manner as described above, on the layer of mixture present on the upper part of the conveyor belt 23. Said pressure may be exerted continuously or intermittently and/or different for each roller, as required.

Figure 7:
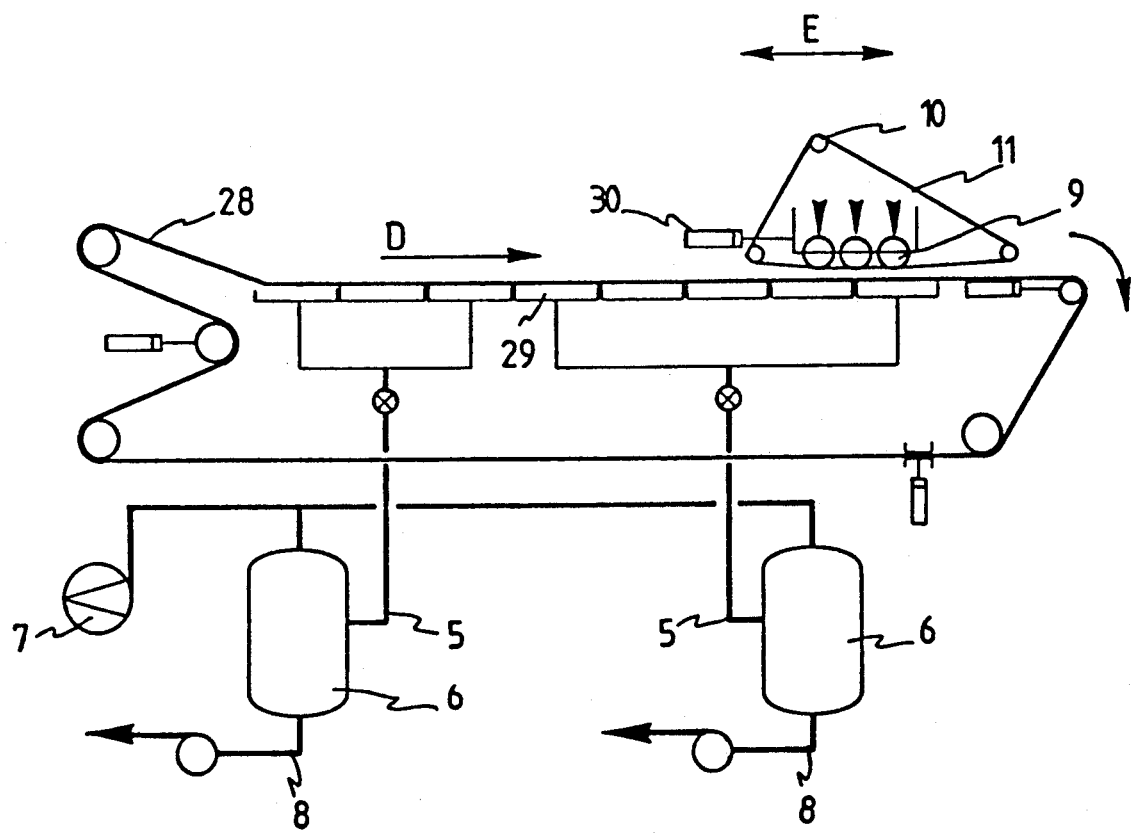
FIG. 7 is a side elevational view of a third possible embodiment of a device according to the invention.

FIG. 7 shows an embodiment wherein an endless conveyor belt 28 is moved over a number of stationary casings 29, in which a sub-atmospheric pressure can be generated in a manner similar to the one described above. The belt 28 will thereby be driven in steps in the direction indicated by the arrow D.

In this embodiment the pressure rollers 9 and the pressure belt 11, if provided, are accommodated in a frame part which is reciprocatingly movable, by means of a setting mechanism 30, in the direction according to the arrow E.

During the movement of the conveyor belt 28 in the direction according to the arrow D the rollers 9 will be pressed down, in the manner described above, on the layer of mixture which is present on the conveyor belt 28 and which is simultaneously moved, by means of the setting mechanism 30, in the same direction as the upper part of the conveyor belt 28. During the standstill period of the intermittently moving belt 28 the pressure rollers 9 will be moved upwards and the frame part supporting the pressure rollers will be returned to its initial position in a direction opposite the direction of movement of the upper part of the belt 28.

Obviously, numerous modifications and variations of the present invention are possible in light of the above teachings. It is therefore to be understood that within the scope of the appended claims, the invention may be practiced otherwise than as specifically described herein.

We claim:

1. A method for removing liquid from a mixture of liquid and solid matter, which comprises:

leading the mixture over at least one casing by means of a conveyor belt which is pervious to liquid;

alternating first periods of operation, during which said casing and said conveyor belt are stationary with respect to each other and in which a subatmospheric pressure is maintained in said casing, with second periods during which relative movement between the conveyor belt and the casing is effected and the pressure in said casing is kept at that of the surrounding atmosphere, compressing the mixture during said first periods by means of pressure rollers, so as to promote the discharge of liquid, said pressure rollers being arranged near said casing, above a part of the conveyor belt supporting the mixture and independently pressing down said pressure rollers on the mixture toward the conveyor belt with an adjustable force, and preventing the rollers during said second periods from exerting a force in the direction of the conveyor belt on the mixture.

2. A method according to claim 1, which comprises blowing a pressurized gas through the mixture downstream of the location where the rollers are pressed down on the mixture.

3. A device for removing liquid from a mixture of liquid and solid matter, which comprises:

an endless conveyor belt which is pervious to liquid and upon which a mixture is placed;

at least one casing over which a conveying portion of said conveying belt is led;

means for intermittently effecting relative movement between the casing and the conveyor belt and for making the casing and the conveyor belt relatively stationary, means for generating a sub-atmospheric pressure in said casing during periods when the conveyor belt and the casing are relatively stationary, a plurality of rollers extending transversely to the direction of movement of the conveyor belt and which are disposed above said conveying portion of the conveyor belt, and means for independently moving said rollers towards and away from the conveying portion.

4. A device according to claim 3, wherein said means for moving the rollers in the direction of the conveyor belt comprises means for independently adjusting pressure of a first roller of said rollers with respect to a second roller of said rollers.

5. A device according to claims 3 or 4, which comprises setting cylinders wherein a shaft which has ends thereof supported by said setting cylinders wherein at least one of said rollers is freely rotatable mounted about such shaft.

6. A device according to claim 5, which comprises an endless pressure cloth which is disposed over the conveying rollers.

7. A device according to claim 6, which comprises a plurality of supporting rollers provided under the casing in proximity with the rollers.

8. A device according to claim 7, which comprises means for driving the casing in such a manner that the peripheral velocity of parts of the supporting rollers making contact with the casing and the endless pressure cloth is at least substantially equal to the velocity of displacement of a part of the conveyor belt supporting the mixture.

9. A device according to claim 3, which comprises means located downstream of the rollers means for blowing a gas through the mixture.

* * * * *